United States Patent [19]

Brooks et al.

[11] 3,861,501

[45] Jan. 21, 1975

[54] DISC BRAKE DRIVE

[75] Inventors: Frank W. Brooks, Dayton; James R. Baber, Miamisburg, both of Ohio

[73] Assignee: General Motors Corp., Detroit, Mich.

[22] Filed: Sept. 24, 1973

[21] Appl. No.: 399,970

[52] U.S. Cl. ............... 188/18 A, 64/27 L, 188/71.1, 188/218 A, 192/30 V, 192/70.2, 403/359
[51] Int. Cl. ............................................. B60t 1/06
[58] Field of Search ...... 188/18 A, 71.1, 73.2, 73.5, 188/218 A, 218 L X; 192/30 V, 70.19, 70.2, 55; 64/14, 15 R, 27 C, 27 L; 403/359

[56] References Cited
UNITED STATES PATENTS

| | | | |
|---|---|---|---|
| 1,461,573 | 7/1923 | Browne | 192/70.19 |
| 3,233,704 | 2/1966 | Strain et al. | 188/218 LX |
| 3,438,464 | 4/1969 | Barrington | 192/70.2 X |
| 3,586,132 | 6/1971 | Tantlinger | 188/218 A X |
| 3,661,235 | 5/1972 | Harrison | 188/218 LX |

*Primary Examiner*—George E. A. Halvosa
*Attorney, Agent, or Firm*—D. D. McGraw

[57] ABSTRACT

A disc brake with an annular disc driven by lugs on its outer periphery. The disc lugs engage slots or keys of a disc retainer which is driven by the wheel hub or axle flange. The slots or keys form ramps which engage the disc lugs in sliding relation so that the disc is axially movable for brake adjustment to accommodate lining wear. A fixed caliper is mounted on the steering knuckle or an axle housing flange. Springs act tangentially between the disc periphery and the drive member to hold the disc securely in the drive member when the brakes are in the released condition, thereby eliminating rattle. The springs may be of a flat wire stock or a flat multiple looped round wire.

4 Claims, 6 Drawing Figures

DISC BRAKE DRIVE

The invention relates to a peripherally driven disc in a disc brake, and more particularly to one which is driven by ramped or angled contact surfaces formed by keys provided in the disc drive section. The disc is able to move axially to accommodate for brake lining wear. The disc and its drive member can induce rattles or other noises at times since some manufacturing clearances are provided between the disc and its drive member. This can occur as the vehicle moves over uneven road surfaces, or when the brakes are applied. Such noises are generated by relative movement of the disc lugs and the disc drive member keys as the clamped disc acts to restrain the rotation of the disc drive member. If the brake lining elements are slightly out of parallel they can prevent the disc surface from maintaining a uniform plane of rotation during a complete revolution, causing small relative movements between the disc and its drive member, also inducing an objectionable noise.

The ramped or angled contact surfaces between the disc and its drive member cause the disc to wedge into the drive member and eliminate relative motion. Springs connected generally tangentially between the disc periphery and the drive member also cause the disc to remain secure in the drive member when the brakes are in a released condition. Two types of springs which may be used are disclosed, including two variations of a generally Omega-shaped member, and a flat multiple looped round wire spring.

Figure 1:
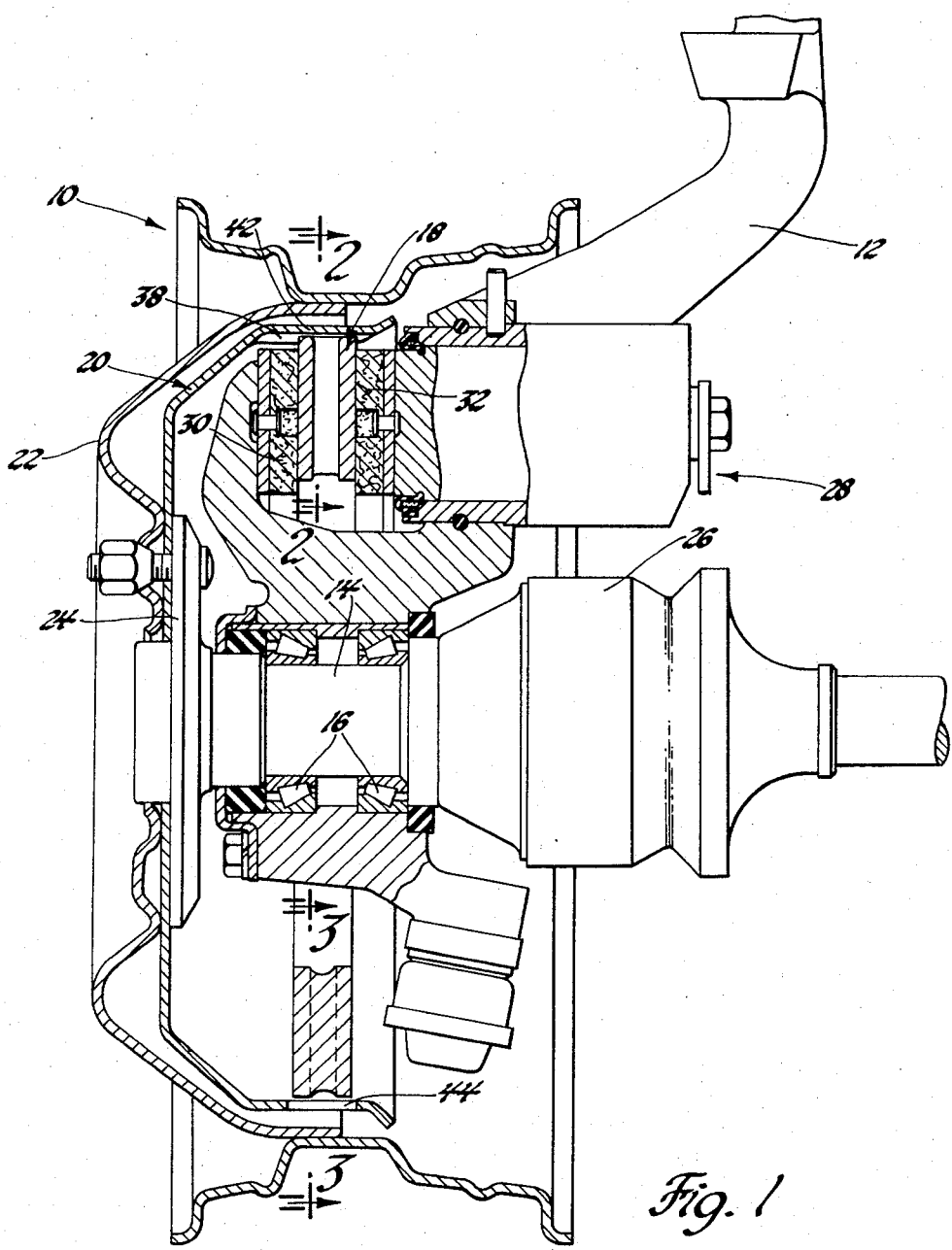
FIG. 1 is an elevation view with parts broken away and in section and showing a disc brake embodying the invention.

The disc brake assembly 10 includes a steering knuckle and fixed caliper section 12 through which the axle 14 is rotatably mounted by bearings 16. The caliper assembly is of the internal type so that it cooperates with the annular sliding disc 18, the disc being mounted and driven on its outer periphery by disc drive member 20. The wheel 22 and the disc drive member 20 are suitably secured to the axle flange 24 so that they rotate with the axle 14. This arrangement is that of a front drive unit, the axle 14 having a universal joint 26. When the arrangement is provided on a non-steerable wheel, the caliper assembly may be mounted on a suitable axle housing.

A cylinder assembly 28 is formed in the steering knuckle and fixed caliper section 12 so that the brake linings 30 and 32 can engage opposite sides of disc 18 in friction brake relation when the cylinder assembly is pressurized.

Figure 2:
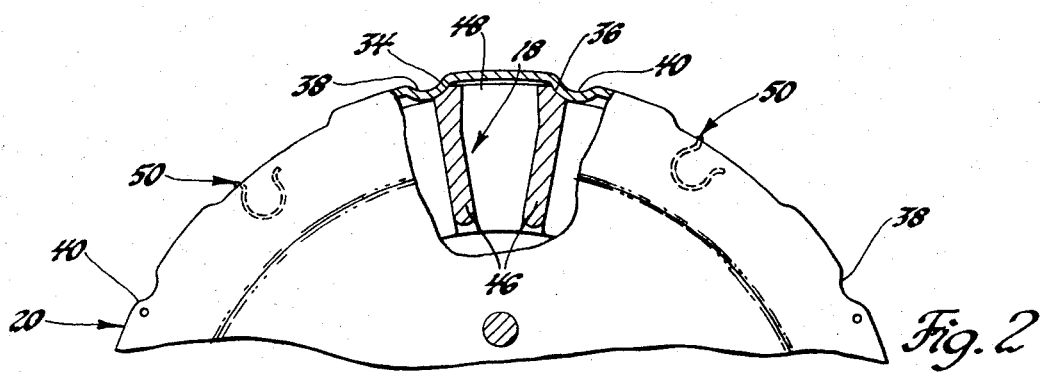
FIG. 2 is a fragmentary view of the connection between the disc drive member and the disc of FIG. 1 taken in the direction of arrows 2—2 of that FIG.

As is better seen in FIG. 2, the disc 18 has a series of circumferentially spaced ramps 34 and 36 which engage complementary ramps 38 and 40, respectively, a series of such ramps being provided on the inner periphery of the open ended cylindrical portion 42 of disc drive member 20. The ramps 38 and 40 are provided on the sides of circumferentially spaced pairs of internal lands and extend axially of the disc drive member. Each pair of internal lands alternates with an aperture 44. The apertures permit insertion of anti-rattle springs and are also provided in the cylindrical portion of the disc drive member in circumferentially spaced relation.

Figure 3:
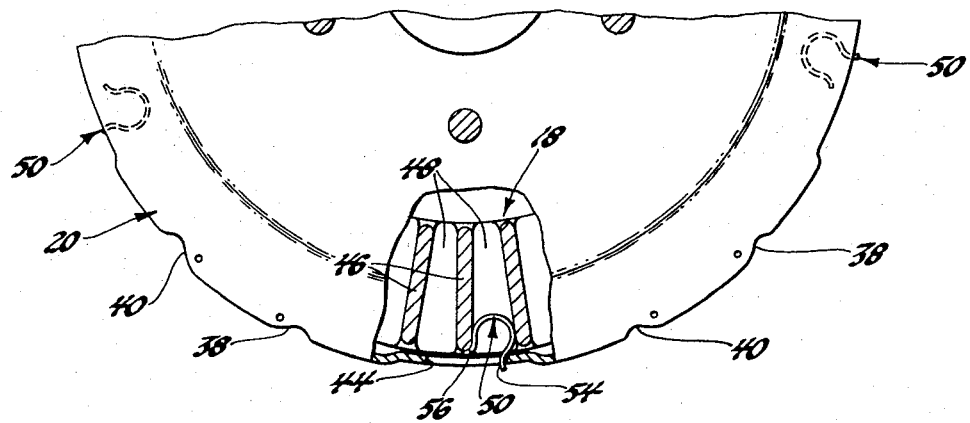
FIG. 3 is a fragmentary view illustrating the installed position of one of the spring members and taken in the direction of arrows 3—3 in FIG. 1.
Figure 4:
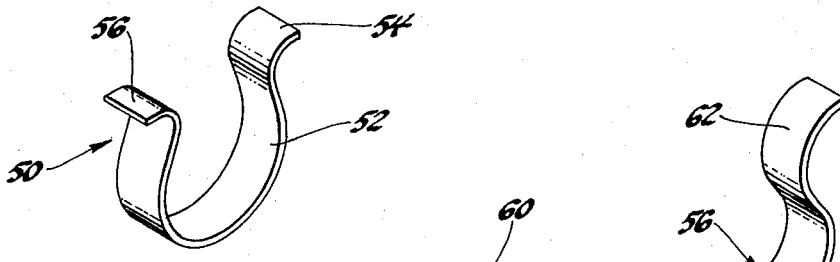
FIG. 4 is a perspective view of one of the spring members illustrated in FIGS. 2 and 3.

The disc 18 has opposite friction braking surfaces joined by radially extending vanes 46 which define air-cooling passages 48 extending from the disc internal periphery to the disc outer periphery. The circumferential spacing of the vanes 46 is such that the disc ramps 34 and 36 are formed on the outer ends of adjacent vanes, and the apertures 44 extend circumferentially across the major portion of at least one air-cooling passage and preferably also extend across much of an adjacent air-cooling passage. This is better seen in FIG. 3. The alignment of each aperture 44 and the vanes forming air-cooled passages 48 permits the installation and removal of each resilient member 50 which provide anti-rattle spring action. The resilient members 50, one of which is shown in periphery FIG. 4, are preferably made of a flat spring stock. They are shaped much like the Greek letter Omega, the arcuate body portion 52 terminating in outwardly turned ends 54 and 56. If resilient member 50 is installed through an aperture 44 so that the spring end 54 engages the edge of an aperture 44, and the other spring end 56 engages the outer end of a vane 46, the spring body 52 fits within an air-cooled passage 48. All of the springs are engaged in the same circumferential orientation so that all urge the disc 18 in the same direction relative to the drive member 20. They, therefore, keep the disc member 34 tightly against the drive member ramps 38, for example, when the brakes are in the released condition.

Figure 5:
FIG. 5 is a perspective view of a slightly modified spring member.

A slightly modified Omega-like spring member 56 may be used when there is greater circumferential spacing between the end of the vane 46 and the end of aperture 44 being engaged by the ends of the spring member. Such a spring is shown in FIG. 5. Instead of having a substantially circular body like the body 52 of spring 50, the body 58 is somewhat flatter in its central area so that the spring ends 60 and 62 are spaced somewhat further apart.

Figure 6:
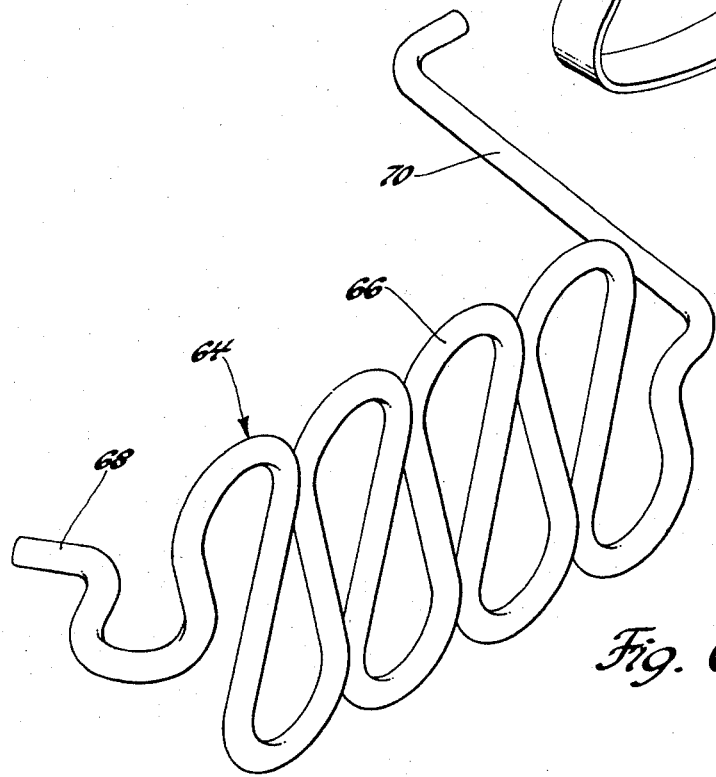
FIG. 6 is a perspective view of a spring member which may be installed in the manner of the spring illustrated in FIG. 3, and having a multiple looped planar body with hooked-ends and formed of round spring wire.

Another type of spring which may be effectively used is illustrated in FIG. 6. The spring 64 is formed of round spring wire bent to provide a multiple loop planar body section 66 terminating with a short hooked-end 68 on one end and a long hooked-end 70 on the other end. A spring is illustrated in its free condition for installation, the hooked-ends 68 and 70 are moved toward each other, bending the body section 64 so that the hooked-ends can be fitted on a vane 46 and an end of aperture 44, with the body section 66 positioned in an air-cooled passage 48 in the manner of resilient member 50 of FIG. 3.

The ramp drive arrangement, in cooperation with the resilient anti-rattle members, permits sliding movement of the disc as necessary to accommodate lining adjustment and other movements required of the disc while effectively preventing undesirable disc noises attributable to rattle of the disc relative to the drive member and sliding movements of the disc relative to the drive member.

It is claimed:

1. A disc brake having a peripherally mounted and driven brake disc and a rotatable dished disc drive and retainer member, said retainer member having an open ended cylindrical section formed with circumferentially spaced pairs of internal lands having beveled edges extending axially thereof and further formed with apertures positioned intermediate said pairs of lands in circumferentially spaced relation, said disc having opposed friction braking side surfaces joined by vanes defining therewith radially extending air-cooling passages opening through the disc outer periphery, and further having circumferentially spaced beveled lugs formed on the outer periphery and axially aligned with said pair of lands so that each lug is received between a pair of said lands in axially sliding and rotationally driving relation, a plurality of resilient members having opposite end portions, each of said resilient members inserted into one of said apertures and one of said air-cooling passages with one of said end portions engaging an edge surface of said one of said apertures and the other of said end portions engaging a circumferentially opposite edge surface of said one of said air-cooling passages in resiliently loaded relation and acting substantially tangentially of said disc and said retainer member.

2. The disc brake of claim 1 in which all of said resilient members act in the same rotational direction.

3. The disc brake of claim 1 in which each of said resilient members is a generally Omega-shaped spring wire formed to provide a body portion and hooked-end portions with one end hooking over an edge of one of said apertures and the other end hooking over the outer edge of one of said vanes and the body portion intermediate the ends positioned in one of said air-cooling passages in a spring-loaded condition.

4. The disc brake of claim 1 in which each of said resilient members is a spring wire formed to provide a multiple looped planar body portion and hooked-end portions of different lengths, the shorter hooked-end portion engaging one of said vanes and the longer hooked end portion engaging an edge of one of said apertures and the body portion being positioned in one of said air-cooling passages in a spring-loaded condition.

* * * * *